July 11, 1961
W. L. KAUFFMAN II
2,991,642
AUTOMATIC INDEX FOR A WRINGER
Filed May 14, 1956
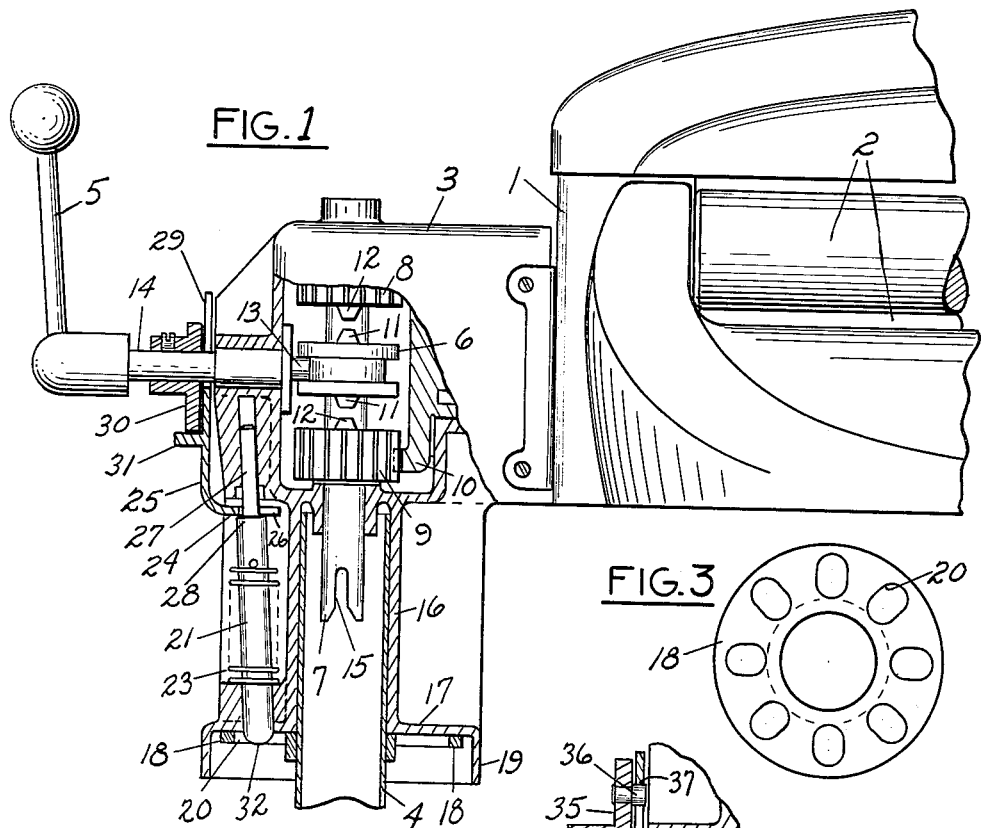
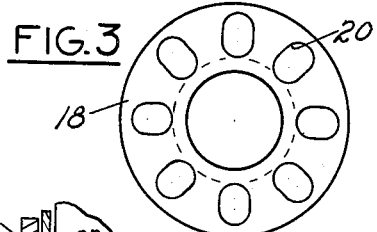
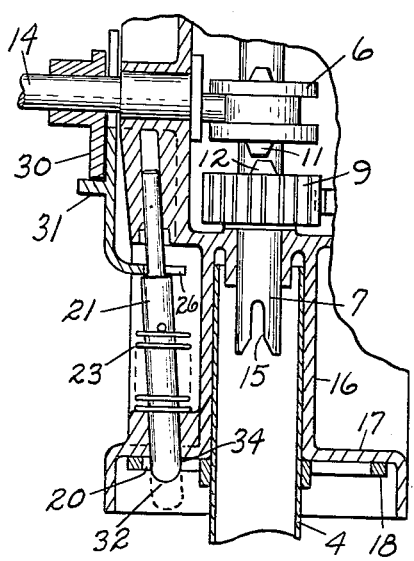
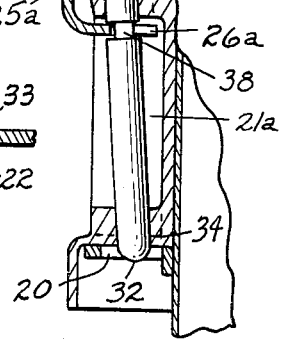
INVENTOR.
Walter L. Kauffman II
BY
Ralph Hammar
attorney 2,991,642
AUTOMATIC INDEX FOR A WRINGER
Walter L. Kauffman II, Erie, Pa., assignor to Lovell Manufacturing Company, Erie, Pa., a corporation of Pennsylvania
Filed May 14, 1956, Ser. No. 584,669
3 Claims. (Cl. 68—255)

This invention is an automatic index for positioning swinging wringers such as used on domestic washing machines. When the drive is in neutral, the wringer is yieldably positioned so it will remain in the selected position but can be manually moved to any other position by a light push on the wringer. As the gears start to drive, the wringer is positively locked in the selected position and cannot be unlocked until the drive is moved out of the driving position. In a preferred form this is accomplished by an index pin movable between partially engaged and fully engaged positions. In the partially engaged position, the pin has a cam faced end which coacts with portions of the edges of the selected opening in the index collar to hold the wringer in place with a relatively light restraint. In the fully engaged position, the index pin is fully received in the selected opening and positively engages edges of the opening so as to lock the wringer so that the driving forces cannot cause movement or swinging of the wringer out of the index position.

In the drawing, FIG. 1 is an elevation of a swinging wringer partly broken away to show the index in the neutral position on the drive, FIG. 2 is a view showing the position of the index as the drive is moved to driving position, FIG. 3 is a plan view of the index collar, FIG. 4 is a view of a modification, and FIG. 5 is an enlarged view showing the yielding restraint offered by the index when the wringer drive is in neutral.

In the drawing, the conventional parts of the wringer are readily identified, 1 being the wringer frame, 2 the rolls, 3 the wringer head, 4 the wringer post, and 5 the handle for controlling the wringer drive gearing which may, for example, consist of a clutch 6 keyed to a shaft 7 and arranged bteween upper and lower gears 8 and 9 which are loose on the shaft 7 and which continuously mesh with a crown gear 10 suitably coupled to the wringer rolls 2. In FIG. 1 the clutch 6 is shown in a neutral position in which clutch teeth 11 are spaced from mating teeth 12 on the gears 8 and 9. The clutch is shifted by an eccentric pin 13 on a shaft 14 to which the control handle 5 is fixed. The shaft 7 has a drive slot 15 for receiving the usual continuously driven drive strap which extends from the washing machine gear box (not shown) up through the wringer post 4. While the washing machine is operating, the shaft 7 and the clutch 6 keyed thereto are continuously driven. When the clutch 6 is moved up or down on the shaft 7 sufficient to bring the clutch teeth 11 into the same plane as the clutch teeth 12 on either the gear 8 or the gear 9, the drive to the wringer is effected through one of the gears 8 or 9, as the case may be, and the crown gear 10. The parts so far described are or may be of common construction and may differ in appearance from the specific structure illustrated.

The wringer head 3 has a depending sleeve-like portion 16 which is rotatably and slidably journaled on the wringer post 4. At its lower end the sleeve 16 merges into a cup-shaped section 17 which rests on an index collar 18 and has a depending rim 19 which encloses the index collar. The index collar is fixed to the wringer post and has a series of angularly spaced openings 20 for receiving an index pin 21. The openings 20 may be punched in the index collar 18 in which case the burr side 22 should be down so that the upper surface of the index collar 18 on which the wringer head is supported will be smooth.

The index pin 21 is biased upward by a coil spring 23 against the lower end 24 of a shifter 25. The shifter has a forked portion 26 straddling a reduced section 27 at the upper end of the index pin and providing the shoulder 28 which engages the lower end of the shifter 25. The upper end of the shifter 25 has a forked section 29 which straddles the shaft 14 to which the control handle 5 is fixed. A cam 30 fixed to the shaft 14 cooperates with a ledge 31 on the shifter 25 and determines the position of the shifter. The upward force of the spring 23 is transmitted through the shoulder 28 to the lower end 24 of the shifter. The spring not only lifts the index pin 21, but it also holds the ledge 31 against the cam 30.

In the uppermost position of the index pin 21 illustrated in FIG. 1, the lower end of the index pin is only partially received in one of the index openings 20. In this position the chamfered or rounded or cam-faced end 32 of the index pin is in the plane of the edges 33 of the selected opening 20 so that as the wringer is swung around the wringer post 4, the only resistance encountered is that offered by engagement of the rounded end 32 with one of the edges 33. The restraint offered by the rounded end 32 is sufficient to hold the wringer in the selected index position in the absence of other forces but is insufficient to prevent deliberate repositioning of the wringer head in another index position by a push on the wringer. The amount of restraint offered by the rounded end of the index pin is determined by the angle of contact with the edges 33 of the index opening 20 and by the weight of the wringer and head. In order to move the wringer from one index position to another, it is necessary that the index pin lift the wringer until the rounded end 32 is above the plane of the index opening 20.

As the drive is moved from the neutral position of FIG. 1 toward the driving position, the index pin 21 is moved downward by the cam 30 fixed on the shaft 14. FIG. 2 shows the position of the index pin when the clutch tooth 11 is just short of the clutch tooth 12 on the gear 9. Any further downward movement of the clutch tooth 11 would start the wringer drive. FIG. 2 accordingly represents the maximum amount the clutch 6 can be moved while still keeping the drive in neutral. In the FIG. 2 position, the rounded or chamfered lower end 32 of the index pin has extended through the selected opening 20 and straight sides 34 on the index pin have come opposite edges 33 of the opening. This provides the desired relation for positively locking the wringer head in the selected index position. The cam action between the straight sides 34 on the index pin and the edges 33 of the opening is no longer present and accordingly a positive locking action is obtained. As the clutch 6 is moved further to the driving position in which the teeth 11 and 12 are in a common plane, the lower end of the index pin moves further downward to the dotted line position in FIG. 2. This further downward travel insures that under no condition can the positive lock become disengaged.

When the wringer drive is returned to neutral, the spring 23 lifts the index pin 21 to the FIG. 1 position. The index pin does not move out of the selected index opening 20 until after the wringer drive has been disconnected because the reaction forces of the wringer drive hold the index pin against the edges 33 of the opening. As soon as the wringer drive is disconnected, the reaction forces due to the driving torque disappear and the spring 23 can easily lift the index pin to the FIG. 1 position.

The cam 30 and the shifter 25 provide an interlock between the drive gearing and the index pin of the type which forces the index pin to the locking position whenever the drive is established and permits movement of the index pin out of the locking position after the drive is returned to neutral. This type of interlock is the easiest to operate under heavy load because the index pin 21 remains in the locking position until the wringer drive is returned to the neutral position.

In FIG. 4 is shown another type of interlock in which the index pin is positively tied to the wringer drive control. In this construction the wringer drive control shaft 14a has fixed thereto a cam 35 having its lower part engaging a shoulder 31a on a shifter 25a and carrying in its upper part a crank pin 36 which fits in a slot 37 in the upper end of a shifter. The lower end of the shifter 25a has a forked end 26a which fits in a groove 38 in the upper part of an index pin 21a. As the control shaft 14a is turned to shift the clutch between driving and neutral positions, the shifter 25a is positively moved up by the pin 36 as it engages the upper end of the slot 37 and down by the cam 35 acting on the shoulder 31a. In the uppermost position shown in FIG. 4, the index pin 21a has the same position relative to the index opening 20 as in FIG. 1, and the wringer is accordingly yieldingly held in the selected index position. As the control shaft 14a is turned in either direction from the position shown in FIG. 4, the shifter 25a is forced downward carrying with it the index pin 21a and bringing the straight sided section 34 of the index pin opposite the edges 33 of the selected opening 20 in the same manner illustrated in FIG. 2. The cam 35 is designed so that when the clutch 6 reaches the position illustrated in FIG. 2, the index pin 21a has the same relative position as the index pin 21 illustrated in FIG. 2. Further turning of the shaft 14a establishes the wringer drive and forces the index pin 21a still further down through the selected index opening.

The construction illustrated in FIG. 4 operates in the same manner as the previously described construction, but will be somewhat harder to operate when the wringer drive is returned to neutral under heavy or stall load conditions. Under those conditions, there will be an appreciable torque reaction holding the index pin 21a against the edges of the selected index opening and considerable resistance will be offered to the upward movement of the index pin until the wringer drive is returned to neutral. This added resistance can be compensated by lengthening the handle 5 so as to provide additional leverage.

In both forms of the invention, the index pin moves between an upper position in which the cam faced lower end of the pin is partially engaged with the selected index opening and offers sufficient restraint to hold the wringer in position in the absence of other forces. This provides a yielding index. In both forms of the invention, as the wringer drive is moved to the driving position, the index pin is moved to a fully engaged position in which the wringer is positively restrained from movement out of the selected index position. This provides a positive index. The combination of a yielding index and a positive index is obtained with a single index pin. Both forms of the invention are safe. When the wringer drive is in neutral the wringer can be moved from one index position to another and the yielding index provides insufficient restraint to make this movement difficult and helps locate the wringer in the newly selected index position. In both forms of the invention there is an interlock which insures that the wringer is positively locked in the selected index position before the wringer drive is established.

What is claimed as new is:

1. In a swinging wringer having a head and frame, a support for the wringer head, said support having index openings and said wringer head having an index pin slidably carried in the head and adapted to be received in any selected one of said openings, said pin being movable relative to the head between a lower position fully received and an upper position partially received in the selected opening, said indexing pin having a cam-like structure at its lower end of cam-like formation adapted to coact with portions of the surfaces of said selected opening in said upper position to provide a yielding index and offering sufficient restraint to hold the wringer head in the selected index position in the absence of other forces but insufficient to prevent deliberate repositioning of the wringer head in another position by a push on the wringer, said indexing pin having another surface structure at its lower end adapted to coact with portions of the surfaces of said selected opening in said lower position to provide a positive index preventing movement of the wringer head from the selected index position under any torque arising during wringing, a drive for the wringer, a control for the drive movable to driving and neutral positions, and an interlock having an operative connection between the control and the indexing pin for effecting movement of the indexing pin to said lower position upon setting of the drive in the driving position and to said upper position upon setting the drive in the neutral position.

2. In a swinging wringer having a frame and head, said head having a depending sleeve-like portion slidably and rotatably receivable on a wringer post, an index collar on the post for engaging the sleeve-like portion of the head to support the head, said collar having index openings and said wringer head having an index pin slidably carried therein and movable between upper and lower positions, said pin being adapted to be received in any selected one of said openings and in said lower position being fully received in the selected opening and in said upper position being partially received in the selected opening, said index pin having a chamfered lower end adapted to coact with portions of the surfaces of said selected opening in said upper position to provide a yielding index and offering sufficient restraint to hold the wringer head in the selected index position in the absence of other forces but insufficient to prevent deliberate repositioning of the wringer head in another position by a push on the wringer, said index pin having a straight section at said lower end adapted to coact with portions of the surfaces of said selected opening in said lower position to provide a positive index preventing movement of the wringer head from the selected index position under any torque arising during wringing, a drive for the wringer, a control for the drive movable to driving and neutral positions, and an interlock having an operative connection between the control and the index pin for effecting movement of the index pin to said lower position upon setting of the drive in the driving position and to said upper position upon setting the drive in the neutral position.

3. In a swinging wringer having a frame and head, said head having a depending sleeve-like portion slidably and rotatably receivable on a wringer post, an index collar on the post for engaging the sleeve-like portion of the head to support the head, said collar having index openings and said wringer head having an index pin slidably carried therein and movable between upper and lower positions, said pin being adapted to be received in any selected one of said openings and in said lower position being fully received in the selected opening and in said upper position being partially received in the selected opening, said index pin having a chamfered lower end adapted to coact with portions of the surfaces of said selected opening in said upper position to provide a yielding index and offering sufficient restraint to hold the wringer head in the selected index position in the absence of other forces but insufficient to prevent deliberate repositioning of the wringer head in another position by a push on the wringer, said index pin having a straight section at said lower end adapted to coact with portions of the surfaces of said selected opening in said lower position to provide a positive index preventing movement of the wringer head from the selected index position under any torque arising during wringing, a drive for the wringer, a control for the drive movable to driving and neutral positions, a spring urging the index pin to said upper position, a cam on the control for the drive having a surface coacting with the index pin in the neutral position of the drive to block the upward movement of the pin and thereby determining its upper position, said cam having a surface coacting with the index pin to force it downward to said lower position in the driving position.

References Cited in the file of this patent

UNITED STATES PATENTS

| | | |
|---|---|---|
| 304,159 | Biggs | Aug. 26, 1884 |
| 532,935 | Woolery | Jan. 22, 1895 |
| 1,450,736 | Smith | Apr. 3, 1923 |
| 1,662,616 | Mitchell | Mar. 13, 1928 |
| 2,595,147 | Kauffman | Apr. 29, 1952 |
| 2,669,110 | Beuscher | Feb. 16, 1954 |

FOREIGN PATENTS

| | | |
|---|---|---|
| 634,333 | Great Britain | Mar. 15, 1950 |